United States Patent [19]

Handa et al.

[11] Patent Number: 5,017,638

[45] Date of Patent: May 21, 1991

[54] METALLIC PAINT FILM

[75] Inventors: Junichi Handa, Toyota; Hiroshi Ito, Ichinomiya; Hiroshi Hattori, Toyota; Akira Suganuma, Okazaki, all of Japan

[73] Assignee: Toyota Jidosha Kabushiki Kaisha, Japan

[21] Appl. No.: 252,329

[22] Filed: Oct. 3, 1988

[30] Foreign Application Priority Data

Oct. 21, 1987 [JP] Japan .............................. 62-265796

[51] Int. Cl.$^5$ .............................................. C08K 3/34
[52] U.S. Cl. ..................... 524/449; 106/195; 523/216; 524/35; 524/403; 428/363
[58] Field of Search ........................ 523/216; 428/363; 106/195; 524/449, 403

[56] References Cited

U.S. PATENT DOCUMENTS

| 2,695,275 | 11/1954 | Gray et al. | 524/403 |
| 4,134,776 | 1/1979 | Rieger et al. | 523/216 |
| 4,849,283 | 7/1989 | Porter, Jr. et al. | |
| 4,954,176 | 9/1990 | Minohara et al. | 106/417 |

FOREIGN PATENT DOCUMENTS

| 0011613 | 3/1974 | Japan | 524/449 |
| 0038870 | 3/1982 | Japan | 524/449 |

OTHER PUBLICATIONS

Chemical Abstracts, vol. 98, 1983, p. 82.

Primary Examiner—Paul R. Michl
Assistant Examiner—U. K. Rajguru
Attorney, Agent, or Firm—Finnegan, Henderson, Farabow, Garrett and Dunner

[57] ABSTRACT

A metallic paint film of this invention comprises a base paint film containing by from 1 to 20 weight % of a novel pigment, which comprises a ceramic scaly substrate, an inorganic compound coating film formed on all the surfaces of ceramic scaly substrate, and a plurality of metal dots formed on the surfaces of inorganic compound coating film and occupying from 0.05 to 95% of the total surface area of the inorganic compound coating film. When an automobile body or the like is painted with the metallic paint film, it gives not only a simple metallic feeling but also a pearly gloss effect. In addition, the metallic paint film improves the three-dimensional effect of the automobile body or the like.

11 Claims, 2 Drawing Sheets

METALLIC PAINT FILM

BACKGROUND OF THE INVENTION

1. Field of the Invention

This invention relates to a metallic paint film, and more particularly to a novel metallic paint film giving an intensified metallic feeling when viewed at the front as well as having a good flip-flop characteristic.

2. Discussion of the Prior Art

A conventional metallic paint film has been known in which aluminum scaly particles are contained. This metallic paint film containing aluminium scaly particles hardly gives a metallic effect with light-colored hues since the aluminum scaly particles have intermediate brightness. In addition, it hardly gives a vivid and clear hue with transparency since the aluminum scaly particles exhibit their inherent cloudy effect.

As disclosed in Japanese Unexamined Patent Publication (KOKAI) No. 92321/1975, a metallic finish paint containing titanized mica has been proposed to overcome the drawbacks mentioned above. The titanized mica comprises mica, and a titanium dioxide film coating the surfaces of mica.

Figure 3:
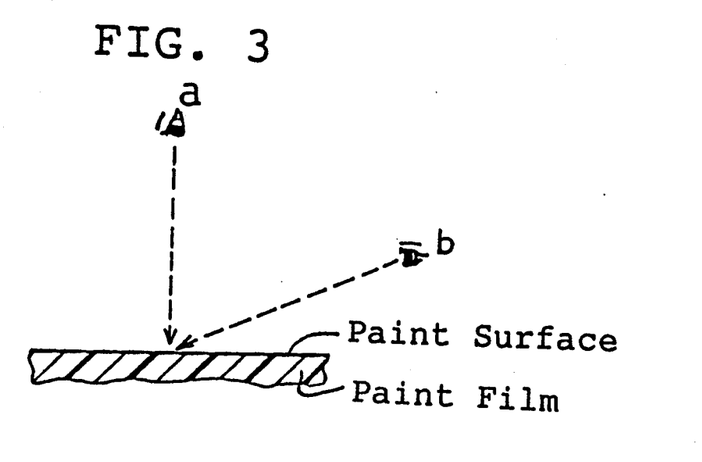
FIG. 3 is an illustration of the flip-flop characteristic of paint film.

The titanized mica gives a pearly gloss effect, and has high brightness. Accordingly, the paint film containing the titanized mica offers the metallic effect with light-colored hues. However, the paint film containing the titanized mica is not so good as the metallic paint film containing aluminum scaly particles with respect to the "flip-flop characteristic" The "flip-flop characteristic" means the difference in contrast when viewed at different angles with respect to a paint film. Namely, the paint film is said to have a greater flip-flop characteristic when the hue viewed substantially at the front with respect to the paint film differs greatly from the hue viewed in an oblique direction with respect to the paint film, or when the hue viewed in the perpendicular direction "a" differs remarkably from the hue viewed in the direction "b" as shown in FIG. 3.

Consequently, an automobile body styling becomes less sharp and offers a reduced three-dimensional effect when the paint film containing the titanized mica is formed on an automobile body, since the paint film has a flip-flop characteristic of a lesser degree. For instance, when viewing the upper part of a door panel painted with the paint film at the front, the lower part of door panel is viewed in an oblique direction. As the paint film has a poor flip-flop characteristic, the upper part and the lower part exhibit similar hues, i.e. the upper part and the lower part look substantially alike, and the "three-dimensional" effect is hardly offered. As a result, the shape of door panel must be redesigned to give it the three-dimensional effect. On the other hand, if the paint film has a good flip-flop characteristic, the upper part and the lower part exhibit different hues, i.e. the upper part looks brighter and the lower part looks darker, Thus, the "three-dimensional" effect will be improved.

Further, the metallic effect offered by the paint film containing the titanized mica is not so good as that offered by the metallic paint film containing aluminum scaly particles. Especially, the metallic effect is least satisfactory when viewed at an oblique angle.

SUMMARY OF THE INVENTION

It is therefore an object of this invention to improve the performance of conventional paint films.

Another object of this invention is to provide a metallic paint film offering a metallic effect having light-colored hues as well as having a good flip-flop characteristic.

A metallic paint film of this invention comprises a base paint film containing a pigment, which comprises a ceramic scaly substrate, an inorganic compound coating film formed on all over the surface of ceramic scaly substrate, and a plurality of metal dots formed on the surfaces of inorganic compound coating film and occupying from 0.05% to 95% of the total surface area of inorganic compound coating film. The base paint film contains from 1 to 20 weight % of such pigment.

Figure 2:
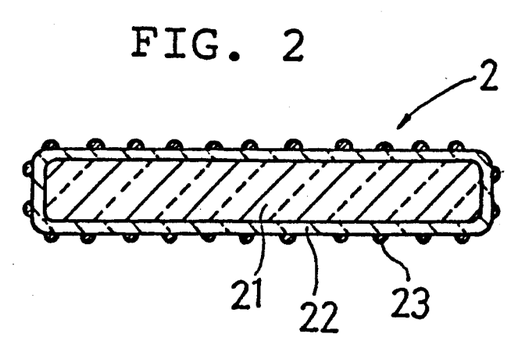
FIG. 2 is a schematic sectional view of a novel pigment employed by the preferred embodiment of this invention.

A major feature of this invention is that the base paint film employs the novel pigment in the amount mentioned above. As schematically illustrated in FIG. 2, the novel pigment has a ceramic scaly substrate 21, an inorganic compound coating film 22 formed on all over the surfaces of ceramic scaly substrate 21, and a plurality of metal dots 23 formed on the surfaces of inorganic compound coating film 22. The metal dots 23 occupy from 0.05% to 95% of the total surface area of inorganic compound coating film 22.

For the ceramic scaly substrate, mica or molybdenum disulfide may be employed. The mica may be natural mica, such as muscovite, biotite and phlogopite, or synthetic mica.

Generally speaking, the ceramic scaly substrate is a thin plate. It has the ratio of thickness to side length which falls approximately in the range of from 1/100 to 1/10. Its average thickness is from $5 \times 10^{-2}$ to $10 \times 10^{-2}$ μm, and its average side length is from 3 to 50 μm for most cases.

For the inorganic compound coating film, the following may be employed: titanium dioxide, iron oxide, aluminum hydroxide, and chromium hydroxide. The inorganic compound coating film is formed as follows: The ceramic scaly substrate is immersed into an aqueous solution of an inorganic salt containing a desired metal to deposit the inorganic salt on the surfaces of the ceramic scaly substrate. The inorganic salt deposited is hydrolyzed and calcined at a predetermined temperature to form a stabilized inorganic compound coating film. A specific inorganic compound and the film thickness are determined in accordance with desired coloring.

Thus, the novel pigment, in which the surfaces of ceramic scaly substrate are coated with the inorganic compound coating film, has two pairs of reflecting surfaces similar to the titanized mica. The rays reflected with the two pairs of reflecting surfaces interfere with each other due to the phase difference. The reflectance for an incident ray with a given wavelength is determined by Fresnel equations. And the interference color is determined by the optical thickness of film, i.e. (Geometrical Film Thickness) X (Index of Refraction). Accordingly, a desired pearly gloss appearance or effect can be achieved by determining the optical thickness of inorganic compound coating film, i.e. the determination of inorganic compound and film thickness. Further, the coloring, such as yellow, red, blue, green, and so on resulting from the interference, depends on the thickness of inorganic compound coating film.

The inorganic compound coating film may further be coated with a coloring film comprising the following coloring agent: chromium oxide, iron oxide, iron blue or carbon black. When it is covered with the coloring film comprising a coloring agent whose color is similar to the color of inorganic compound coating film, the color resulting from the interference will be enhanced. When it is covered with the coloring film comprising a coloring agent whose color is different from the color of inorganic compound coating film, a still another coloring will be obtained.

For the metal dots, the following may be employed: silver, gold, copper, palladium, cobalt, nickel-phosphorus alloy, nickel-boron alloy, nickel-cobalt-phosphorus alloy, nickel-tungsten-phosphorus alloy, silver-gold alloy, and cobalt-phosphorus alloy.

The metal or alloy dots are formed on the surfaces of inorganic compound coating film in a scattered manner and occupy from 0.05% to 95% of the total surface area of inorganic compound coating film. The metal dots may be formed by electroless plating. If the metal dots occupy less than 0.05% of the total surface area of inorganic compound coating film, no effect of metal dots formation is appreciable, and the paint film containing the novel pigment has as poor flip-flop characteristic as that of the paint film containing the simple titanized mica. If the metal dots occupy more than 95% of the total surface, there is no appreciable difference between the effect given by the paint film containing the novel pigment and the feeling given by the paint film containing the titanized mica all of whose surfaces are covered with a metal film. The paint film containing the titanized mica whose surfaces are covered with the metal dots by more than 95% gives a featureless hue as it becomes less transparent and loses the pearly gloss effect. It is especially preferable to form the metal dots in the ratio of from 0.2% to 50% of the total surface area of inorganic compound coating film. When the metal dots are formed or deposited in a ratio falling in this range, the paint film of this invention containing the novel pigment having a metallic and pearly gloss effect gives not only an appealing hue but also a good flip-flop characteristic.

The metallic paint film comprises a base paint film containing the novel pigment described above. The base paint film may preferably contain the novel pigment in the amount of from 1 to 20 weight %. If the base paint film contains the novel pigment in an amount less than 1%, the metallic paint film does not give a satisfactory metallic effect. On the other hand, if the base paint film contains more than 20% of the novel pigment, the paint film becomes less clear and the surface of paint film is less likely to be even since the novel pigment becomes less dispersed in a paint.

As for a vehicle for the novel pigment, the following resin vehicles may be employed: a melaminealkyd resin, a thermosetting acrylic resin, acrylic lacquer, and nitrocellulose lacquer. These resin vehicles have employed pigments for the conventional metallic base paint film. The resin vehicle may further contain coloring pigments, extender pigments, and additives such as a dispersing agent, a running prevention agent, a plasticizer, and a color separation prevention agent.

It is sufficient to form one layer of the base paint film on a substance to be painted, but it is preferable to form a coloring paint film under the base paint film. Although a layer or a substance lying under the base paint film can be easily seen through it since the base paint film has less covering power and is too transparent, this characteristic of base paint film may be turned to an advantage by exposing the color of underlying coloring paint film. In this way, the metallic paint may give further appealing appearance resulting from the combined effect of the color of base paint film and the color of underlying coloring film, and painting colors may be selected from a wide variety of colors. In addition, it is preferable to form a clear paint film on the base paint film. The more appealing appearance will be given by forming the clear paint film since the clear film increases the glossiness.

The metallic paint film of this invention exhibits a higher brightness "La" when viewed from an approximately perpendicular direction (FIG. 4) than that of the metallic paint film containing the conventional semi-transparent titanized mica, since the light reflectance is increased by the metal dots formed on the novel pigments. On the contrary, the brightness "Lb" when viewed in an oblique direction (FIG. 4) is decreased, since the light which travels through the paint film is blocked by the metal dots and the light transmittance decreases. Consequently, the metallic paint film of this invention exhibits a higher "La/Lb" value, and has a good flip-flop characteristic. In addition, the metallic paint film of this invention gives an improved metallic effect not only when it is viewed at the front but also when it is viewed at an oblique angle, since the light is reflected more by the metal dots.

The metallic paint film of this invention gives a gloss effect inherent in a metal as well as a pearly gloss effect, and offers a novel appearance which has never been achieved by the conventional metallic paint films. It is impossible to achieve the novel appearance by simply mixing the titanized mica or the aluminum scaly particles with the colored pigment such as black, blue and yellow pigment.

Thus, when an automobile body or the like is painted with the metallic paint film of this invention, the metallic effect is improved, and also the three-dimensional effect of automobile body and the like is improved since the silhouette of the automobile body or the like is well defined. Moreover, the automobile body or the like painted with the metallic paint film offers a novel appearance, since the metallic paint film gives not only the simple metallic effect but also the pearly gloss effect.

BRIEF DESCRIPTION OF THE DRAWINGS

The above and other objects, features and advantages of this invention will become fully apparent from the following description taken in conjunction with the accompanying drawings, in which.

DETAILED DESCRIPTION OF THE PREFERRED EMBODIMENTS

Preferred embodiments of this invention will be hereinafter described with reference to the accompanying drawings.

First Preferred Embodiment

A first preferred embodiment according to this invention employs a novel pigment comprising a ceramic scaly substrate 21, an inorganic compound coating film 22 and metal dots 23 as illustrated in FIG. 2. Mica is employed for the ceramic scaly substrate 21, titanium dioxide is employed for the inorganic compound coating film 22, and silver is employed for the metal dots 23.

More specifically, silver was plated in the amount of 1.6 weight % on the surfaces of pearl mica (titanized mica), "Iriodin 9103" produced by Merck Japan Co., Ltd., by electroless plating. The novel pigment had silver dots 23 formed on the surfaces of the titanium dioxide film 22 in a scattered manner, and the silver dots 23 occupied 2.2% of the total surface area of titanium dioxide film 22. This novel pigment offers a slightly greenish metallic gloss effect.

The novel pigment was added in the amount of 3 weight %, mixed and stirred well with the following paint components to prepare a base paint:

260 weight % of a 50% solution of acrylic resin, "Acryldick A320" produced by Dai Nippon Ink Kagaku Kogyo Co., Ltd.;

183 weight % of a 60% solution of methylated melamine resin, "Super Beckamine L117-60" produced by Dai Nippon Ink Kagaku Kogyo Co., Ltd.;

50 weight % of a 20% solution of cellulose resin derivative, "EAB551" produced by Eastman Kodak Co., Ltd.; and 4 weight % of xylene.

Figure 1:
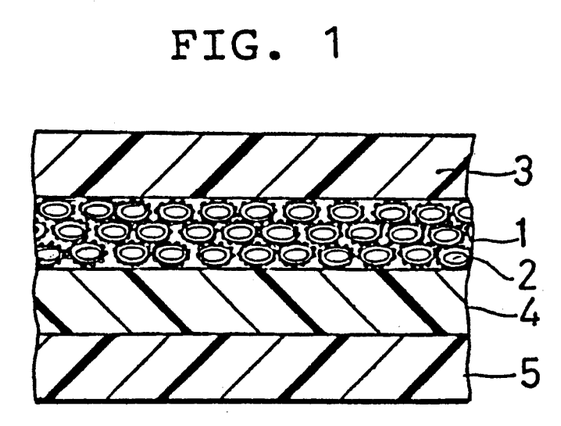
FIG. 1 is a schematic sectional view of a paint film according to a preferred embodiment of this invention.

A metallic paint film having an arrangement as schematically shown in FIG. 1 was painted. A test specimen with an electrocoated paint film 5 and an intermediate coloring paint film 4 was prepared. After spraying the base paint described above, acrylicmelamine resin clear paint was sprayed on the test specimen in a wet-on-wet manner. The test specimen was baked at 140° C. for 23 minutes to form a base paint film 1 and a clear paint film 3 integrally on the test specimen with the electrocoated paint film 5 and the intermediate coloring paint film 4.

As given in Table 1, this metallic paint film offered a pearly gloss effect as well as a metallic effect and had a high-grade and deep hue, which is distinct from the metallic effect offered by the conventional paint films. When it is viewed from the front, it looks brighter. When it is viewed from an oblique direction, it looks darker. Thus, it has a remarkable flip-flop characteristic.

preferred embodiment. Although the base paint employed the same kind of novel pigment, the pigment differed from the one employed in the first preferred embodiment with respect to the following:

Silver was plated in the amount of 6.4 weight % on the surfaces of pearl mica (titanized mica), and the silver dots 23 occupied 8.9% of the total surface area of titanium dioxide film 22.

When the covering power of this base paint determined it was found that the covering film thickness was 74 μm and the in-process covering film thickness was 25 μm or less, according to the covering power test. Accordingly, it was fully applicable to a conventional top coating process for automobile bodies, i.e. 2-coat-1-bake process.

A metallic paint film was painted as described in the first preferred embodiment, and the appearance of this metallic paint film was evaluated. As also given in Table 1, it had a preformance equivalent to that of the preferred embodiment.

Comparative Example 1

Comparative example 1 employed a base paint containing aluminum scaly particles, "Alpaste 1109MA" produced by Toyo Aluminum Co., Ltd., instead of the base paint containing the novel pigments employed by the first and the second preferred embodiments. Other than this arrangement, the base paint of this comparative example 1 was prepared by the same method as described in the first preferred embodiment. A metallic paint film was then painted by the same method as also described in the first preferred embodiment. The appearance offered by comparative example 1 is given in Table 1.

The metallic paint film of comparative example 1 offered a metallic effect, but it was not as good as those of the preferred embodiments. Its transparency and pearly gloss effect were far worse than those of preferred embodiments. In addition, it had a flip-flop characteristic somehow, but the characteristic is far inferior to those of preferred embodiments.

Comparative Example 2

TABLE 1

| | Pigment Employed | Flip-Flop Characteristic | Transparency | Metallic Gloss Feeling | Pearly Gloss Feeling | Silky Feeling |
| --- | --- | --- | --- | --- | --- | --- |
| Example 1 | Novel Pigment | Excellent | Excellent | Excellent | Excellent | Excellent |
| Example 2 | Novel Pigment | Excellent | Excellent | Excellent | Excellent | Excellent |
| Comparative Example 1 | Aluminum Scaly Particles | Fair | Poor | Good | Poor | Poor |
| Comparative Example 2 | White Titanized Mica | Poor | Good | Fair | Excellent | Good |
| Comparative Example 3 | White Titanized Mica & Coloring Pigment | Poor | Fair | Fair | Good | Fair |
| Comparative Example 4 | Aluminum Scaly Particles & Coloring Pigment | Fair | Poor | Good | Poor | Poor |

Note: In the novel pigments employed by the first and the second preferred embodiments, the silver dots occupied 2.2% and 8.9% of the total surface area of titanized dioxide film respectively.

Second Preferred Embodiment

In this second preferred embodiment, a base paint was prepared in the same method employed by the first This comparative example 2 employed a base paint containing a plain white titanized mica pigment, "Iriodin 103WS" produced by Merck Japan Co., Ltd., instead of the base paint containing the novel pigments employed by the first and the second preferred embodiments. No metal dots 23 were formed on the surfaces of the titanium dioxide film 22 of the white titanized mica pigment. Other than this arrangement, the base paint of this comparative example 2 was prepared by the same method as described in the first preferred embodiment. A metallic paint film was then painted by the same method as also described in the first preferred embodiment. It had a worse covering power, i.e. its covering film thickness was 100 μm or more.

The appearance offered by comparative example 2 is given in Table 1. Although it offered a pearly gloss effect, it offered a less metallic effect. Its metallic effect was still worse when viewed from an oblique direction, and it had little flip-flop property.

Comparative Example 3

A mixed color base paint was prepared as follows:

1% by weight of cyanine blue and 3% weight of carbon black were dispersed in 60% alkyd resin solution, "Phatalkyd 133-60" produced by Hitachi Kasei Kogyo Co., Ltd. The following paint components were then added to the dispersion and stirred well:

60 weight % of 60% solution of methylated melamine resin, "Super Becamine L117-60" produced by Dai Nippon Ink Kagaku Kogyo Co., Ltd.;

50 weight % of 60% alkyd resin solution, "Phatalkyd 133-60" produced by Hitachi Kasei Kogyo Co., Ltd.;

30 weight % of xylene; and 5 weight % of a plain white titanized mica pigment, "Iriodin 103WS" produced by Merck Japan Co., Ltd., employed by comparative example 2.

The mixed color base paint was painted in accordance with the method described in the first preferred embodiment. A metallic paint film obtained offered a poor metallic gloss effect and a poor flip-flop characteristic.

Comparative Example 4

This comparative example employed the same arrangement as that of comparative example 3, but it employed aluminum scaly particles instead of the plain white titanized mica pigment employed by comparative example 3, i.e. "Iriodin 103WS" produced by Merck Japan Co., Ltd. The aluminum scaly particles were the ones employed by comparative example 1, i.e. "Alpaste 1109MA" produced by Toyo Aluminum Co., Ltd.

This metallic paint film did not offer a pearly gloss effect, and was less transparent due to the cloud resulting from the aluminum scaly particles.

Results of Exaluation on Preferred Embodiments and Comparative Examples

Table 1 summarizes the results of evaluation. As given in Table 1 and marked with "Excellent", the metallic paint films employing the novel pigment, i.e. the first and the second preferred embodiments, showed good performance with respect to all of flip-flop characteristic, transparency, metallic effect, pearly gloss effect and silky effect. On the other hand, the metallic paint film employing the aluminum scaly particles instead of the novel pigment employed by the first and the second preferred embodiments, i.e. comparative example 1, showed poor transparency, a poor pearly gloss effect and a poor silky effect. The metallic paint film employing the titanized mica pigment free from the metal dots 23, i.e. comparative example 2, showed a poor flip-flop characteristic. Further, the metallic paint film employing the titanized mica mixed with the coloring pigments like black, blue and yellow, i.e. comparative example 3 showed much worse performance than comparative example 2 with respect to the transparency, pearly gloss effect and silky effect. Furthermore, the metallic paint film employing the aluminum scaly particles mixed with coloring pigments like black, blue and yellow, i.e. comparative example 4 showed no better appearance than comparative example 1.

Flip-Flop Characteristic Evaluation

Figure 4:
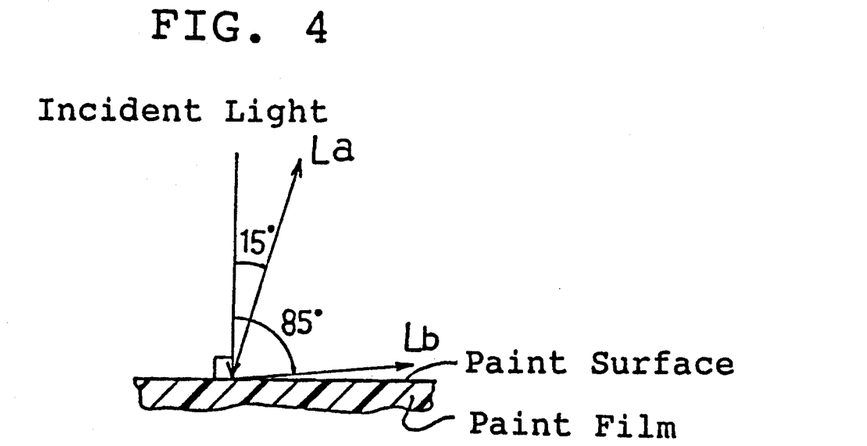
FIG. 4 is an illustration on how evaluation was done on the flip-flop characteristic of paint film.

Then, as illustrated in FIG. 4, the flip-flop characteristic was evaluated numerically on how it depends on brightness. Light was directed perpendicularly onto a paint surface. The brightness "La" of reflected light was observed at an angle of 15 deg. with respect to the perpenducular, and the brightness "Lb" of reflected light was observed at an angle of 85 deg. with respect to the perpendicular. As the ratio, "La/Lb", becomes greater, the brightness difference between observing directions becomes greater. Therefore, when "La/Lb" value is great, the paint surface has a good flip-flop characteristic.

As given in Table 2, base paints were prepared by employing the noble pigments as employed by the first and the second preferred embodiments, highly gloss aluminum scaly particles for comparative example 5, aluminum scaly particles for comparative example 6, and titanized mica pigments for comparative examples 7 through 9. The highly gloss aluminum scaly particles for comparative example 5 were "Kansai Paint #166" produced by Kansai Paint Co., Ltd. The aluminum scaly particles for comparative example 6 were "Kansai Paint #167" produced by Kansai Paint Co., Ltd. The titanized mica pigment for comparative example 7 was red interference mica, "Kansai Paint #3HI" produced by Kansai Paint Co., Ltd. The titanized mica pigment for comparative example 8 was blue interference mica, "Kansai Paint #8E3" produced by Kansai Paint Co., Ltd. The titanized mica pigment for comparative example 9 was white titanized mica, "Nippon Paint #042" produced by Nippon Paint Co., Ltd.

The base paints were painted on the surface of a gray intermediate coloring paint film to form metallic paint films. The "La" and "Lb" of the metallic paint films were measured with a variable angle colorimeter, and the results of measurement and the values of "La/Lb" are also given in Table 2.

TABLE 2

| | Pigment Employed | La | Lb | La/Lb |
| --- | --- | --- | --- | --- |
| Example 1 | Novel Pigment | 109.6 | 15.3 | 7.2 |
| Example 2 | Novel Pigment | 91.2 | 10.1 | 9.0 |
| Comparative Example 5 | Aluminum Scaly Particles (highly gloss) | 160.4 | 16.9 | 9.5 |
| Comparative Example 6 | Aluminum Scaly Particles | 66.6 | 7.2 | 9.2 |
| Comparative Example 7 | Red Titanized Mica | 25.2 | 7.1 | 3.5 |
| Comparative Example 8 | Blue Titanized Mica | 20.2 | 4.0 | 5.0 |
| Comparative Example 9 | White Titanized Mica | 106.3 | 29.9 | 3.6 |

Note: In the novel pigments employed by the first and the second preferred embodiments, the silver dots occupied 2.2% and 8.9% of the total surface area of titanized dioxide film respectively.

The "La/Lb" values for the first and the second preferred embodiments were 7.2 and 9.0 respectively. While the "La/Lb" values for comparative examples 7 through 9 varied from 3.5 to 5.0. Therefore, it was found that the flip-flop characteristics of the first and the second preferred embodiments were improved remarkably and approached those of comparative examples 5 and 6 employing the highly gloss aluminum scaly particles and the aluminum scaly particles respectively and having the "La/Lb" values of 9.2 and 9.5 respectively.

In this case, it is preferred that the "La" value is 50 or more. This is because the metallic paint film exhibits bright gray but gives no light-colored metallic effect if the "La" value is approximately up to 40. It is especially preferred that the "La" value is 90 or more. If so, the metallic paint film gives a good gloss effect. As for the "Lb" value, it is preferred that the value is 20 or less. The metallic paint film exhibits black if the value is 20 or less, and it exhibits gray and the difference between the "La and "Lb" values diminishes sharply if the value is more than 20. Further, it is preferred that the "La/Lb" value is 6 or more, and it is especially preferred that the "La/Lb" value is 9 or more. A metallic paint film exhibits a poor flip-flop characteristic if the "La/Lb" value is less than 6. The metallic paint films of the first and the second preferred embodiments satisfied the requirements mentioned above.

The metallic films of comparative examples 5 and 6 employing the highly gloss aluminum scaly particles and the aluminum scaly particles respectively exhibited high "La/Lb" values of 9 or more. They were as good as the preferred embodiments regarding the flip-flop characteristics contributed by the brightness. However, the metallic films of comparative examples 5 and 6 employing the aluminum scaly particles did not change their color hues as the viewing direction was changed. On the other hand, the metallic films of preferred embodiments exhibited metallic gloss resulting from the metallic dots, and pearly gloss resulting from the light interference in the portions free from the metal dots. The portions free from the metal dots were very transparent, and the color of undercoat paint surface was likely to be exposed. As a result, the metallic paint films of preferred embodiments changed their color hues depending on the viewing directions, and had a good flip-flop characteristic resulting from the combined effect of the changing color hues and the brightness difference.

What is claimed is:

1. A metallic paint film comprising:
a base paint film containing from 1 to 20 weight % of a pigment comprising a ceramic scaly substrate, an inorganic compound coating film formed on all the surfaces of said ceramic scaly substrate, and a plurality of metal dots formed on the surfaces of said inorganic compound coating film and occupying from 0.05% to 95% of the total surface area of said inorganic compound coating film and the balance being a transparent vehicle.

2. A metallic paint film according to claim 1, wherein said ceramic scaly substrate is mica.

3. A metallic paint film according to claim 2, wherein said inorganic compound coating film is titanium dioxide.

4. A metallic paint film according to claim 2, wherein said metal dots are formed on the surfaces of said inorganic compound coating film an occupy of from 1.2% to 50% of the total surface area of said inorganic compound coating film.

5. A metallic paint film according to claim 4, wherein said metallic paint film has a flip-flop characteristic exhibiting an La value of 50 or more, an LB value of 20 or less, and the ratio of LA to LB is 6 or more.

6. A metallic paint film comprising:
a base paint film consisting essentially of:
from 1 to 20 weight % of a pigment comprising mica, a titanium dioxide film formed on all the surfaces of said mica, and a plurality of silver dots formed on the surfaces of said titanium dioxide film a ratio of from 0.05% to 95% of the total surface area of said titanium dioxide film;
from 1 to 30 weight % of acrylic resin;
from 1 to 30 weight % of methylated melamine resin; and
from 1 to 10 weight % of cellulose resin derivative.

7. A metallic paint film according to claim 6, wherein said silver dots are formed on the surfaces of said titanium dioxide film and occupy from 0.2% to 50% of the total surface area of said titanium dioxide film.

8. A metallic paint film according to claim 6, wherein said metallic film has a flip-flop characteristic exhibiting an LA value of 50 or more, an LB value of 20 or less, and the ratio of LA to LB is 6 or more.

9. A metallic paint film according to claim 1, further including a coloring paint film formed under said base paint film.

10. A metallic paint film according to claim 9, further including a clear paint film formed on said base paint film.

11. A metallic paint film according to claim 1, further including a clear paint film formed on said base paint film.

* * * * *

UNITED STATES PATENT AND TRADEMARK OFFICE
CERTIFICATE OF CORRECTION

PATENT NO. : 5,017,638

DATED : May 21, 1991

INVENTOR(S) : Junichi Handa, Hiroshi Ito, et al.

It is certified that error appears in the above-identified patent and that said Letters Patent is hereby corrected as shown below:

Abstract, line 11, change "feeling" to --effect--.

Column 1, line 32, change "The" to --. The term--.

Column 1, line 53, change ""three-dimensional"" to --three-dimensional--.

Column 1, line 59, change ""three-dimensional"" to --three-dimensional--.

Column 4, line 15, change "in" to --from--.

Column 4, line 36, before "automobile" insert --the--.

Column 5, line 68, after "prepared" change "in" to --by--.

Column 5, line 68, after "employed" change "by" to --in--.

Column 6, line 9, after "paint" insert --was--.

Column 6, line 19, after "the" insert --first--.

UNITED STATES PATENT AND TRADEMARK OFFICE
CERTIFICATE OF CORRECTION

PATENT NO. : 5,017,638
DATED : May 21, 1991
INVENTOR(S) : Junichi Handa, Hiroshi Ito, et al.

It is certified that error appears in the above-identified patent and that said Letters Patent is hereby corrected as shown below:

Column 7, line 60, after "silky" change "effect" to --feeling--.

Column 7, line 65, after "silky" change "effect" to --feeling--.

Column 8, line 5, after "silky" change "effect" to --feeling--.

Claim 4, column 10, line 14, change "an occupy of" to --and occupy--.

Claim 5, column 10, line 19, change "LB" to --Lb--.

Claim 5, column 10, line 20, change "LA to LB" to --La to Lb--.

Claim 5, column 10, line 20, after "more" insert --, wherein said La is the brightness, viewed at an angle of 15 degrees with respect to the perpendicular, of reflected light and Lb is the brightness, viewed at an angle of 85 degrees with respect to the perpendicular, of reflected light, when incident light is directed perpendicularly onto the surface of the metallic paint film and the brightness of light reflected therefrom is measured.--

UNITED STATES PATENT AND TRADEMARK OFFICE
CERTIFICATE OF CORRECTION

PATENT NO. : 5,017,638
DATED : May 21, 1991
INVENTOR(S) : Junichi Handa, Hiroshi Ito, et al.

It is certified that error appears in the above-identified patent and that said Letters Patent is hereby corrected as shown below:

Claim 6, column 10, line 26, change "a ratio of" to --and occupying--.

Claim 8, column 10, line 40, change "LA" to --La--.

Claim 8, column 10, line 40, change "LB" to --Lb--.

Claim 8, column 10, line 41, change "LA to LB" to --La to Lb--.

Claim 8, column 10, line 41, after "more" insert --, wherein said La is the brightness, viewed at an angle of 15 degrees with respect to the perpendicular, of reflected light and said Lb in the brightness, viewed at an angle of 85 degrees with respect to the perpendicular, of reflected light, when incident light is directed perpendicularly onto the surface of the metallic paint film and the brightness of reflected light therefrom is measured--.

Signed and Sealed this

Twenty-second Day of December, 1992

Attest:

DOUGLAS B. COMER

Attesting Officer    Acting Commissioner of Patents and Trademarks